(12) United States Patent
Delacour et al.

(10) Patent No.: US 8,958,670 B2
(45) Date of Patent: Feb. 17, 2015

(54) DEVICE FOR COUPLING AN ELECTROMAGNETIC WAVE BETWEEN A WAVEGUIDE AND A SLIT METAL GUIDE, METHOD FOR MANUFACTURING SUCH A DEVICE, AND OPTICAL AND ELECTRIC COUPLER FOR AN OBJECT USING THE OPTICAL COUPLING DEVICE

(75) Inventors: Cecile Delacour, Grenoble (FR); Badhise Ben Bakir, Brezins (FR); Jean-Marc Fedeli, Saint-Egreve (FR); Alexei Tchelnokov, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 85 days.

(21) Appl. No.: 13/514,830

(22) PCT Filed: Dec. 7, 2010

(86) PCT No.: PCT/FR2010/000817
§ 371 (c)(1),
(2), (4) Date: Jun. 8, 2012

(87) PCT Pub. No.: WO2011/070249
PCT Pub. Date: Jun. 16, 2011

(65) Prior Publication Data
US 2012/0251030 A1    Oct. 4, 2012

(30) Foreign Application Priority Data
Dec. 9, 2009    (FR) ..................... 09 05965

(51) Int. Cl.
*G02B 6/42* (2006.01)
*G02B 6/122* (2006.01)
*B82Y 20/00* (2011.01)

(52) U.S. Cl.
CPC ............... *G02B 6/1226* (2013.01); *B82Y 20/00* (2013.01)
USPC ......................................................... 385/39

(58) Field of Classification Search
None
See application file for complete search history.

(56) References Cited

U.S. PATENT DOCUMENTS

| | | | |
|---|---|---|---|
| 6,178,275 B1 | 1/2001 | Nerses et al. | |
| 6,408,123 B1 | 6/2002 | Kuroda et al. | |
| 6,897,498 B2 | 5/2005 | Gothoskar et al. | |
| 8,498,503 B2 * | 7/2013 | Mary et al. ...................... | 385/11 |

(Continued)

FOREIGN PATENT DOCUMENTS

| | | |
|---|---|---|
| EP | 0 927 906 A1 | 7/1999 |
| WO | WO 89/01171 A1 | 2/1989 |

OTHER PUBLICATIONS

Veronis et al., "Theoretical investigation of compact couplers between dielectric slab waveguides and two-dimensional metal-dielectric-metal plasmonic waveguides," *Optics Express*, Feb. 5, 2007, pp. 1211-1221, vol. 15, No. 3, Optical Society of America, USA.
Roelkens et al., "Efficient Silicon-on-Insulator Fiber Coupler Fabricator Using 248-nm-Deep UV Lithography," *IEEE Photonics Technology Letters*, Dec. 2005, pp. 2613-2615, vol. 17, No. 12.

(Continued)

*Primary Examiner* — Sung Pak
(74) *Attorney, Agent, or Firm* — Oliff PLC

(57) ABSTRACT

The device for coupling an electromagnetic wave includes a waveguide and a slit metal guide. The slit metal guide is formed by two metal elements which are coplanar and spaced out from one another so as to form the slit. The slit metal guide is arranged in a plane offset from the plane of the waveguide and partially covers said waveguide, said waveguide and the slit guide being maintained at a distance from one another by a dielectric.

26 Claims, 7 Drawing Sheets

(56) References Cited

U.S. PATENT DOCUMENTS

| | | |
|---|---|---|
| 2004/0188794 A1 | 9/2004 | Gothoskar et al. |
| 2005/0249451 A1 | 11/2005 | Baehr-Jones et al. |
| 2008/0225918 A1* | 9/2008 | Achtenhagen et al. .... 372/44.01 |
| 2009/0324164 A1* | 12/2009 | Reshotko et al. ................ 385/14 |
| 2010/0079222 A1* | 4/2010 | Makita ........................... 333/238 |
| 2011/0075962 A1* | 3/2011 | Block ............................. 385/12 |
| 2012/0177318 A1* | 7/2012 | Zheng et al. ...................... 385/1 |

OTHER PUBLICATIONS

Yariv, "Coupled-Mode Theory for Guided-Wave Optics," *IEEE Journal of Quantum Electronics*, Sep. 1973, pp. 919-933, vol. QE-9, No. 9.

Reed et al., *Silicon Photonics An Introduction*, 2004, pp. 16-25, 61-64 and 211, John Wiley & Sons, Ltd.

* cited by examiner

DEVICE FOR COUPLING AN ELECTROMAGNETIC WAVE BETWEEN A WAVEGUIDE AND A SLIT METAL GUIDE, METHOD FOR MANUFACTURING SUCH A DEVICE, AND OPTICAL AND ELECTRIC COUPLER FOR AN OBJECT USING THE OPTICAL COUPLING DEVICE

TECHNICAL FIELD OF THE INVENTION

The invention relates to a device for coupling an electromagnetic wave including:
a waveguide,
a slit metal guide.

STATE OF THE ART

The size of the electronic components is steadily reducing, which allows the increase in the integration density of these components into the same chip. In the field of optoelectronics, it has been necessary to decrease accordingly the size of the waveguides to optically reach these components with a good effectiveness. Without taking any particular precautions, the effectiveness of coupling is substantially equal to the ratio of the surface of the optical mode through the waveguide to the surface characteristic of the device to be addressed.

The miniaturization of the optical circuits has already led to a miniaturization of the planar optical guides, whose section can go down to dimensions about of 200 nm by 400 nm. However, these reductions are not sufficient when it is sought to reach, for example, a nanowire of 50 nm.

The document "Theorical investigation of compact couplers between dielectric slab waveguides and two-dimensional metal-dielectric-metal plasmonic waveguides" published in "Optic Express" Vol. 15, N 3 of Feb. 5, 2007 describes a device for coupling of an electromagnetic wave. Such a device, illustrated in FIGS. 1, 2 and 3, uses a silicon guide composed of two elements 1a, 1b and a silver guide 2 of the metal-dielectric-metal type interposed between the two elements 1a, 1b. The elements 1a, 1b and the silver guide are arranged end to end. The guide 2 of the metal-dielectric-metal type is composed of two silver elements 3a, 3b separated by a slit 4 filled with dielectric. The thus-delimited slit 4 is substantially coaxial with the central axis of the elements forming the silicon guide 1a, 1b, where the amplitude of the electromagnetic field generated by the wave is maximum. Such a device is complex to manufacture because it requires a perfect fit of the various elements placed end to end. This structure forms a resonant device whose transmittance is very sensitive to the incidental wavelength. Moreover, such a device induces a problem of reflection, indeed, one part of the incidental wave moves in the silicon guide 1a and is transmitted in the silver guide 2 but another part is reflected. Thus, such a coupling is not satisfactory because it induces a significant fall of the effectiveness of the coupling of the electromagnetic wave.

OBJECT OF THE INVENTION

An object of the invention aims at carrying out a compact and effective coupling between a waveguide and a slit metal guide.

This object is reached by the annexed claims and more particularly by the fact that the slit metal guide is formed by two metal elements which are coplanar and spaced out so as to form a slit, and in that the slit metal guide is arranged on a plane offset from the plane of the waveguide and partially covers said waveguide, said waveguide and the slit guide being maintained at a distance from one another by a dielectric.

The invention also relates to a method form manufacturing a coupling device characterized in that it comprises on a substrate the following successive steps:
of forming a waveguide,
of forming a slit metal guide in a plane offset from the plane of the waveguide so that the slit is formed by two coplanar metal elements and the slit metal guide partially covers the waveguide.

The invention also relates to an electric and optical coupler for an object, said coupler comprises an optical coupling device and an electric coupling element provided with two electrodes arranged at the slit of the slit guide, said object being in contact with at least one of the electrodes.

BRIEF DESCRIPTION OF THE DRAWINGS

Other advantages and characteristics will more clearly arise from the following description of particular embodiments of the invention given as nonrestrictive examples and represented in the annexed drawings in which.

DESCRIPTION OF PREFERENTIAL EMBODIMENTS

Figure 1:
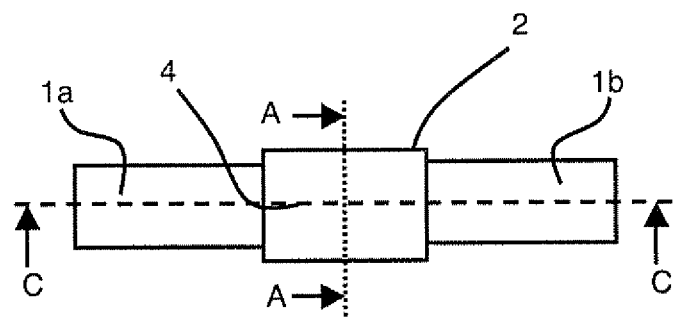
FIG. 1 illustrates a coupling device according to the prior art.
Figure 2:
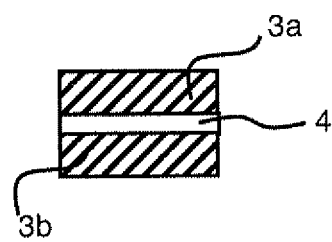
FIG. 2 illustrates the coupling device in FIG. 1 according to a section line A-A.
Figure 3:
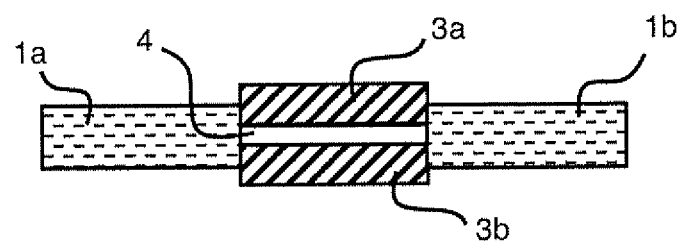
FIG. 3 illustrates the coupling device in FIG. 1 according to a section line C-C.
Figure 4:
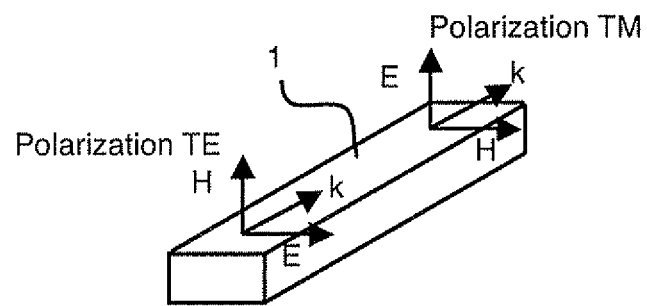
FIG. 4 respectively illustrates the propagation of a component TM and TE of an electromagnetic wave through a waveguide.

As illustrated in FIG. 4, when an electromagnetic wave, also called optical wave in this field (for a wavelength range from visible wavelengths to the far and middle infra-red wavelengths), is propagated along a longitudinal axis of the waveguide 1 as indicated by the wave vector K, this wave breaks up into two states of polarization. A first state forms a transverse electric TE component and a second state forms a transverse magnetic TM component. The component TM comprises an electric field E perpendicular to the plane of the guide and a magnetic field H parallel to the plane of the guide. The component TE comprises a magnetic field H perpendicular to the plane of the guide and an electric field E parallel to the plane of the guide.

Figure 5:
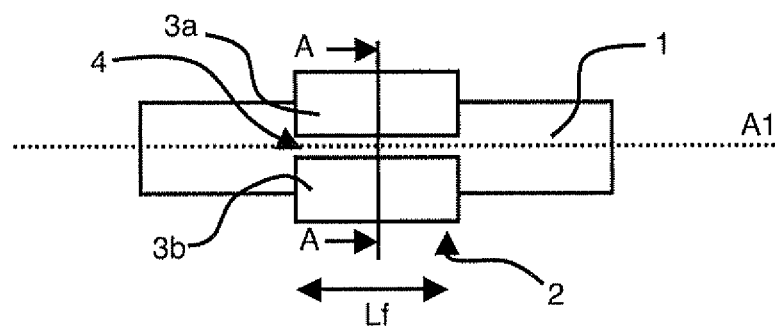
FIG. 5 illustrates a top view of an embodiment according to the invention.
Figure 6:
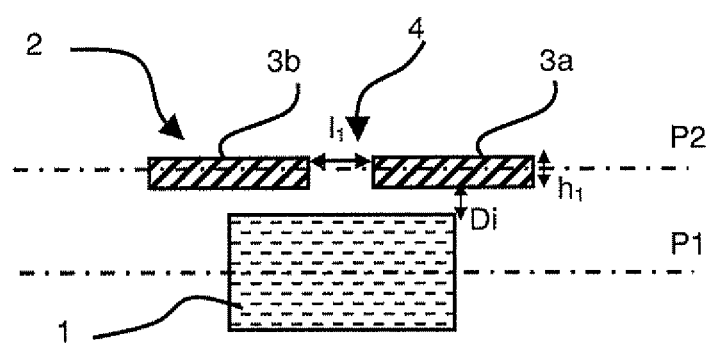
FIG. 6 illustrates a sectional view according to A-A in FIG. 5.

As illustrated in FIGS. 5 and 6, the coupling device for an electromagnetic wave (i.e. for example an optical wave as previously described) comprises a waveguide 1, for example formed by a silicon guide, which can be in the form of a strip. Such a waveguide can be made out of a material of the III or IV type or an alloy of these types of materials such as InP, GaS, InGaS. Advantageously, the waveguide 1 is transparent for the wave considered. In a general way, the waveguide 1 can be a plane guide partially etched (edge guide) and/or locally structured for containing for example networks for coupling the waveguide 1 with an optical fiber. The coupling device moreover comprises a slit metal guide 2, preferably formed by two metal elements 3a, 3b which are coplanar and spaced out so as to form said slit 4. As an example, the metal elements 3a, 3b can be made out of silver or copper.

The slit metal guide 2 is arranged on a plane P2 offset from the plane P1 of the waveguide 1 and partially covers said waveguide 1 (FIG. 6). This covering allows the interaction of the evanescent fields of the two guides in order to carry out the coupling. Preferably, the two guides 1, 2 are maintained at a distance from one another by a dielectric which makes it possible to limit the reflection, the diffusion or the absorption of the wave. In other words, the waveguide 1 and the slit metal guide 2 can separated by an interval D. The dielectric can be in the form of a layer on the one hand in contact with the waveguide 1, and on the other hand in contact with the slit metal guide 2, it can thus have a thickness equal to $D_i$. This dielectric can be a layer of silicon oxide. More generally, the dielectric material used can have a low refractive index relative to the refractive index of the silicon guide. Preferably, this refractive index lies between 1 and 2.5, and makes it possible to confine at best the optical wave in the waveguide 1 in order to prevent the latter from diffusing outside said waveguide 1. The waveguide can have, as an example, an index of about 3.55.

When an electromagnetic wave is propagated through a guide, a part of this wave penetrates into the surrounding medium, thus generating a so-called evanescent field. This length of penetration is proportional to the ratio of refractive indexes of the guide and its surrounding medium. Thanks to the coupling of a waveguide 1 with a slit metal guide 2 as described, the evanescent field in the waveguide can be gradually accumulated by the slit metal guide 2 when the two guides are close to one another. This process is also reciprocal.

In an embodiment illustrated in FIGS. 5 and 6, the waveguide 1 is composed of only one element forming a strip, preferably out of silicon. The slit metal guide 2, for example out of silver, is formed by two metal elements 3a, 3b which are coplanar and spaced out from one another so as to form said slit 4. The slit 4 is preferably oriented along a longitudinal axis A1 of the waveguide 1. Preferably, the slit 4 is centered so that it is included in a plane perpendicular to the plane of the waveguide 1 and passing through the center thereof, the intersection of the two planes forms then the longitudinal axis A1 of the waveguide 1. As the view in FIG. 5 is a top view of the coupling device, the slit metal guide 2 is arranged above the waveguide 1 so that the slit metal guide 2 partially covers the waveguide 1. The embodiment in FIGS. 5 and 6 is not restrictive, thus in a general way the slit metal guide 2 and the waveguide 1 can be substantially disorientated and offset.

Figure 7:
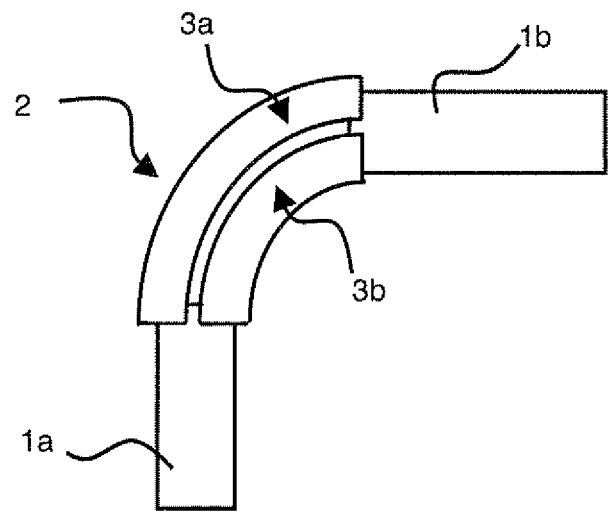
FIG. 7 illustrates another embodiment of a device according to the invention.

According to an alternative embodiment, illustrated in FIG. 7, the waveguide 1 consists of two elements 1a and 1b which are not on the same axis, the slit metal guide 2 is then curved in order to connect the two elements 1a and 1b together. In FIG. 7, the two elements 1a and 1b are spaced out from one another and their longitudinal axes are perpendicular.

According to a particular embodiment, as the electromagnetic field in the slit guide is transverse, only the TE-polarized natural modes of the waveguide 1 are coupled, i.e. only the component TE is propagated through the slit guide 2 while the component TM remains in the waveguide 1. Thus, the coupling device is also called a co-directional coupler.

In the embodiment example containing a waveguide 1 out of silicon and a slit metal guide 2 out of silver, the coupling is carried out between the fundamental modes (with a higher effective index) TE of both guides, this mode coupled with the slit metal guide 2 allows a containment of the coupling in the slit of said slit guide 2. The power density obtained in the slit guide 2 is then magnified by about 100.

The use of evanescent fields makes it possible to increase the effectiveness of the coupling compared to the end-to-end coupling in the prior art. The coupling mechanism between the waveguide 1 and the slit metal guide 2 can be illustrated by means of equations obtained in a perturbative approach of the Maxwell's equations, for a simplified system in which both guides are identical. These equations will be sufficient to represent the wave propagation through a coupled system and the parameters which influence this coupling. A thorough description is given by A. Yariv in "coupled mode theory for guided wave optics", IEEEJ. Quant. Elec. 9, 919, 1973.

The waveguide 1 and the slit metal guide 2 can be monomode or multimode according to the width and/or the height of the waveguide 1 and the width and/or the thickness (or height) of the metal elements 3a, 3b of the slit metal guide 2. It is also possible to exploit the width of the slit in order to select mode(s) to be coupled and to form thus a filter for mode(s). According to a development, a mode of the waveguide 1 and a mode of the slit metal guide 2 have the same effective index and are coupled. A mode corresponds to a space configuration of the electromagnetic field induced by the propagation of an electromagnetic wave through the guide associated to said mode. According to the distribution of the electromagnetic field, a given mode sees an index different from that of the materials of the guide and the index seen by each mode defines an effective index. An effective index can be defined as the ratio of the wavelength in vacuum to the wavelength in the medium to propagate.

The optimal-coupling effectiveness (F) is defined as the fraction of power transmitted from a first guide to a second guide at a distance characteristic $L_c$ also called length of effective coupling:

$$F = \frac{1}{1 + \left(\frac{\Delta n_{eff,L}}{\Delta n_{eff,S}}\right)^2}, \text{ with} \quad (1)$$

$$L_c = \frac{\lambda}{2\sqrt{\Delta n_{eff,S}^2 + \Delta n_{eff,L}^2}}, \quad (2)$$

where, $\lambda$ is the operating wavelength (wave moving through the coupling device), $\Delta n_{eff,L}$ is the difference between the effective indices of the modes supported by the guides in the absence of a coupling. These modes are called local modes.

$\Delta n_{eff,S}$ is the difference between the effective indices of the modes (called supermodes) supported by the coupling structure including the two juxtaposed guides (waveguide and slit metal guide). These two supermodes are by construction symmetrically opposite one another. One speaks then about symmetrical and antisymmetrical supermodes. This physical quantity depends on the interval Di which separates the two guides. This distance Di conditions the coupling length $L_c$ as well as the transferred-power ratio.

The transfer of power from a guide to the other is a harmonic and thus reversible process. By considering a nominal output $P_0$ injected into the waveguide 1, the power collected or transmitted in the slit metal guide 2 at the position z is expressed in the following way:

$$P_{1\to2}(z) = P_0 \cdot F \, \sin^2\left(\frac{\pi}{2L_c} \cdot z\right) \quad (3)$$

According to the relation (3), the transfer of power from the first guide to the second guide is optimal for odd multiples of the characteristic coupling length $L_C$.

The effectiveness of the coupling can be improved according to the distance separating the waveguide 1 and the slit metal guide 2, their effective indices, the length of the slit metal guide 2 or the partial covering length for the guides.

Thus, according to a first improvement, it is preferable to use two guides 1, 2 whose effective indices $n_{eff}$ of the not coupled modes are substantially equal so that the term F in the equation (1) tends to one. Preferably, the ratio of the effective index of the waveguide 1 to the effective index of the slit metal guide 2 lies between 0.8 and 1.2, and preferentially is equal to 1. The effective index of a mode can vary according to the dimensions (width and thickness) of the guide considered, such a variation is described in "Silicon photonics" Reed, G. T., Knights, A. P., ed. Wiley (2004). In order to allow an optimal interaction of the modes of the waveguide 1 and the metal guide slit 2, it is possible to set the effective index of a first guide, then to adjust the geometrical dimensions of a second guide to be coupled with the first one in order to obtain adjusted effective indexes between the natural modes of each guide.

In the example, the effective index of the modes supported by these guides can be numerically calculated by a mode solver by using the FDTD method (for finite-difference frequency-domain). In this particular example, the geometry, and thus the effective index $n_{eff}$ of the slit guide 2 is fixed. The dimensions of the waveguide 1 out of silicon will be characterized by setting, for example, its height, and by varying its width in order to obtain an effective index substantially equal to that of the slit metal guide 2. The effective index of the slit metal guide 2 depends on the width $l_1$ of the slit 4, the height $h_1$ of the slit 4 (FIG. 6) and of the type of material used. According to the example, the slit metal guide 2 is made out of silver, the width $l_1$ of the slit 4 is of 25 nm and the height $h_1$ of the slit 4 is of 50 nm, the effective index of such a guide is set to 2.25 in FIG. 8 (curve Ag). In this FIG. 8, a curve Si is also reported, this curve illustrates the evolution of the effective index $n_o$ of the silicon guide according to its width Wsi. Consequently, FIG. 8 makes it possible to determine a intersecting point for the curves Ag and Si where the effective indices of the two guides are equal. Thus, for the slit metal guide 2 out of silver previously described, the preferential width of the associated silicon guide is of 410 nm.

In this particular example, the width of the waveguide out of silicon 1 thus depends on the effective index of the slit metal guide 2. This width of the silicon guide 1 will be different if one changes the metal of the slit guide or if dimensions of the slit 4 vary.

According to a second improvement, the interval Di separating the two guides 1, 2 is adjusted in order to optimize the coupling length and effectiveness. In the particular case when the effective indices of the two guides when those are not coupled are rigorously identical, the equation (1) is equal to one and the interval Di has an influence only on the coupling length $L_c$ and thus the compactness of the device.

Figure 8:
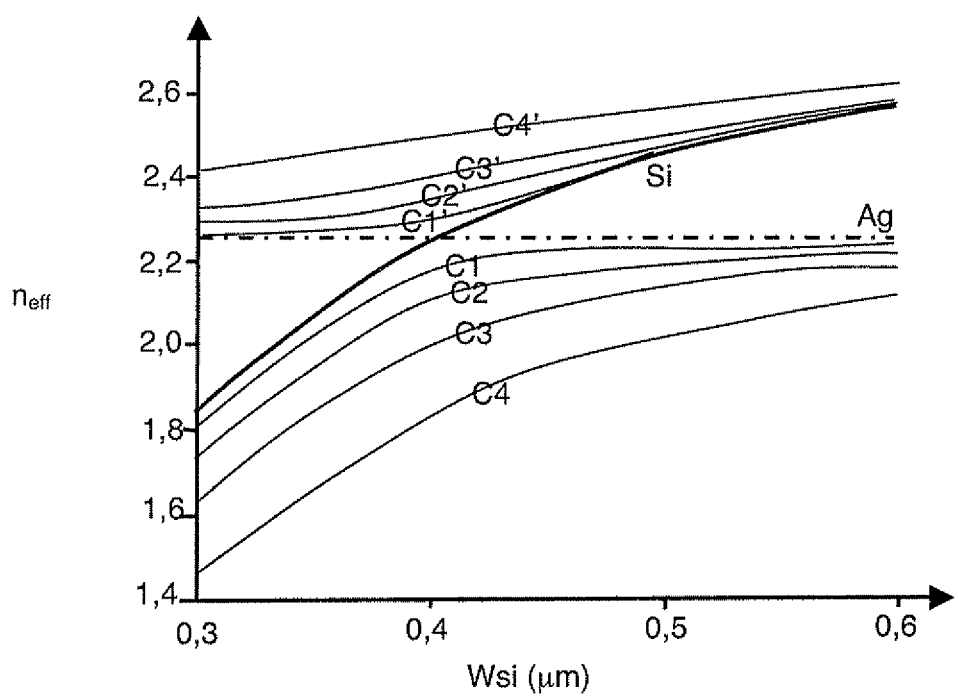
FIG. 8 illustrates curves representative of the evolution of the effective index according to the width of a waveguide out of silicon.

According to the particular example using a silicon strip guide 1 and a silver slit guide 2, it has been carried out four testing devices respectively associated with separation intervals Di of 250 nm, 150 nm, 100 nm, and 50 nm. The graphical representation in FIG. 8 illustrate the variations of the effective indices of the even and odd supermodes of the structure according to the width of the silicon guide. The curves C1, C2, C3, C4 are respectively associated with the distances 250 nm, 150 nm, 100 nm, and 50 nm in the odd supermode and the curves C1', C2', C3', C4' are respectively associated with the distances 250 nm, 150 nm, 100 nm, and 50 nm in the even supermode. The reading of the graphical representation in FIG. 8 makes it possible to determine that the closer the guides are, the more important the effective index variation between the even and odd supermodes is at the intersection point.

Indeed, at the intersection point of the curves Ag and Si, the coupling constant is all the more large because the effective index variation between the even and odd supermodes is important, in accordance with the preceding relation (1). A small interval Di, equivalent to a large effective index variation of the supermodes, is thus preferable for increasing the coupling effectiveness. However, the more important the effective index variation is, the more the coupling force or power increases. A small interval is thus preferable for increasing the coupling effectiveness.

Preferably, the interval Di separating the two guides has a minimum of 10 nm and a maximum of about the working or operating wavelength, i.e. according to the wavelength to be coupled. Indeed, if there were no offset, the separation interval could be null and the guides in contact. Such a contact between the two guides would generate a diffraction of the electromagnetic wave, and thus a loss of coupling effectiveness. Moreover, if the slit metal guide 2 were in contact with the silicon waveguide 1, there would be a risk of contaminating the optical properties due to the migration of the metal species into the silicon guide.

According to a third improvement, the partial covering length $L_r$ of the waveguide 1 by the slit metal guide 2 is an odd multiple of an effective coupling length Lc (equation (2)) between the two guides 1, 2. The effective coupling length Lc is defined as the shortest length for which the power injected into the waveguide 1 is maximum in the slit metal guide 2. This transfer of power into the slit metal guide 2 is periodic, said period being $L_b=2L_c$, $L_b$ being also called beat length.

Thus, the covering length is preferably equal to the coupling length or more generally to an odd multiple (2n+1)*Lc for transmitting the electromagnetic wave from one guide to the other, n being a positive or null integral.

The use of a slit metal guide 2 whose total length is equal to the covering length which is an odd multiple of the coupling length Lc advantageously makes it possible to contain the component TE in the slit metal guide 2. Consequently, the component TE ends up in the slit guide 2 and the component TM keeps on being propagated through the waveguide 1.

The coupling length and the coupling effectiveness can also be optimized by a parametric study by means of digital simulations using for example the FDTD method (finite-difference frequency-domain). This numerical method is used to simulate the electromagnetic wave propagation through structures. The operating process of the example uses a Gaussian beam generated in the silicon strip guide 1 and being propagated along k. The working wavelength was selected around 1550 nm. According to the particular example of the silver slit guide 2 and the silicon guide 1, the coupling length Lc for which 75% of the power is transmitted to the slit metal guide 2 is equal to 0.9 μm. It is the expression of a great index difference of the two supermodes, i.e. a great coupling force which consequently allows a strong compactness of the device. This characteristic also means that phase difference between the two supermodes, in other words the coupling, is thus not very sensitive to the wavelength and to the geometrical dimensions of the guides (great manufacturing tolerance).

Of course, the various above-mentioned improvements can be used in combination, their synergy makes it possible to obtain an optimal effectiveness of the coupling device.

Figure 9:
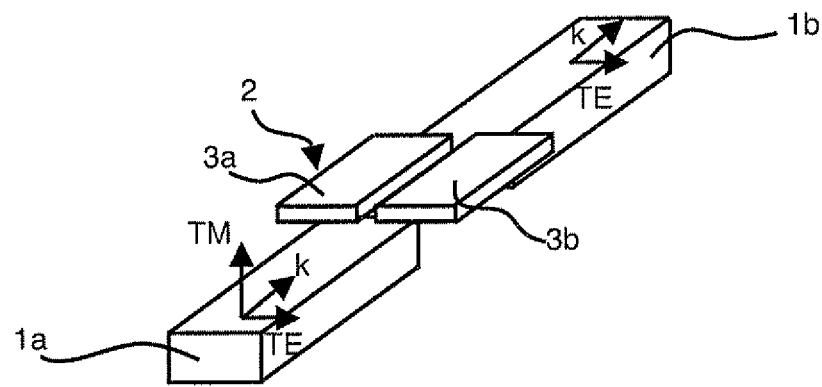
FIG. 9 illustrates another embodiment of the invention.
Figure 10:
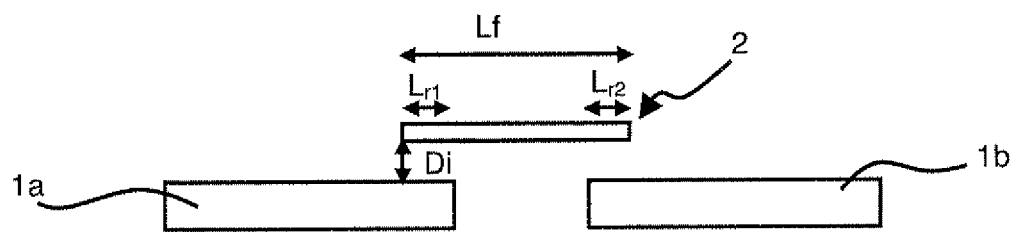
FIG. 10 illustrates a side view of the device in FIG. 9.

According to a particular embodiment illustrated in FIGS. 9 and 10, the waveguide is formed by two elements 1a, 1b, preferably aligned along the same axis. The slit metal guide 2 is arranged so as to partially cover two proximal portions 1a, 1b of said elements over the covering lengths $L_{r1}$ and $L_{r2}$. This makes it possible to carry out along the propagation direction k of the electromagnetic wave a first coupling between the element 1a of the waveguide and the slit metal guide 2, then a second coupling between the slit metal guide 2 and the element 1b of the waveguide. According to an embodiment, only the components TE are propagated through the slit guide, these components are the only ones to be coupled during the second coupling. Preferably, the covering lengths $L_{r1}$ and $L_{r2}$ of the waveguide by the slit guide 2 at each portion of the element 1a, 1b are respectively equal to an odd multiple of the effective coupling length $L_c$. The methods for determining the previously-described effective coupling length $L_c$ apply to this embodiment.

When the waveguide is formed by the two elements 1a, 1b, the two proximal portions can optionally be thinned in order to reduce the section of the waveguide so that the signal not coupled with the slit metal guide 2 is not reflected by the end of the waveguide.

In addition to their allowing the coupling of the two guides, the coupling device and its embodiments can be used to make optoelectronic components (detectors, emitters, nonlinear optical components) according to the nature of the medium forming the slit of the slit metal guide 2. Indeed, such a coupling makes it possible to increase the light-matter interaction thanks to the containment in the slit in order to make the devices more powerful (sensitivity, effectiveness, nonlinearity). The use of a slit metal guide 2 makes it possible, according to applications, to use its two metal elements 3a, 3b as electrodes, for example, for detecting or applying a voltage difference at the ends of said slit. The application of a voltage allows, for example, to modulate the index of the material (for example SiOx) in the slit, i.e. between the two coplanar metal elements 3a, 3b.

Another application can be the detection or the stimulated emission of submicronic objects such as nano-wire, nano-antennas, quantum boxes, etc. Indeed, the components TE of the electromagnetic wave contained in the slit guide 2 can more easily converge towards an object of some nanometers placed in said slit. As previously, the metal elements 3a, 3b of the slit guide 2 can form electrodes able to apply a stimulus or to measure values.

In a general way, the slit can also be filled with a material having particular optical properties such as the nonlinearity with materials of the SiOx type (silica filled with silicon nanocrystals) or of the polymeric type. The material can also have emission properties and be of the SiOx type (silica filled with silicon nanocrystals) doped with Erbium ions or ions of the family III-V (AsGa or InP). The material can also have modulation properties and be of the BST or PZT type (ferroelectric materials with piezoelectric properties). In other words, the slit can be filled with a nonlinear material, a material with emission properties or a material with modulation properties.

In an alternative, it is possible to fill the slit 4 with germanium or silica filled with silicon nanocrystals and to use the metal elements 3a, 3b for applying a voltage to the material filling the slit in order to make it more or less transparent. This makes it possible for example to form filters for modulating the phase or the amplitude of the wave considered.

Figure 11:
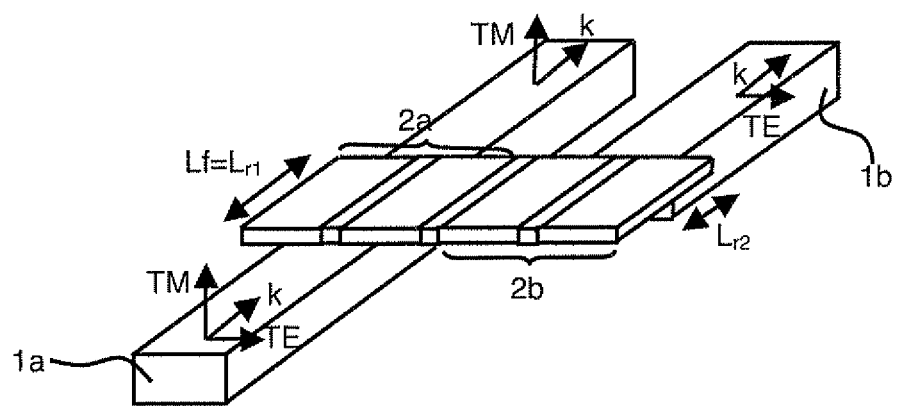
FIG. 11 illustrates another embodiment of the invention.

Another application can be the separation of the waves TE and TM into two waveguides 1a, 1b. A device using the invention for fulfilling such a function is illustrated in FIG. 11. Such a separating device comprises a first waveguide 1a coupled to a first slit metal guide 2a. The covering length $L_{r1}$ of the first slit metal guide 2a on the first waveguide 1a is an odd multiple of the coupling length, thus making it possible to contain the component TE in the first slit metal guide 2a. In the particular case in FIG. 11, the waveguide 1a is continuous and the covering length $L_{r1}$ is equal to the length Lf of the first slit metal guide 2a. According to the axis of displacement k of the to electromagnetic wave in the first waveguide 1a, only the component TM is present after the first slit metal guide 2a because the latter has not been coupled. The first slit guide 2a is coupled with a second slit guide 2b coupled as for it to a second waveguide 1b. The covering length $L_{r2}$ of the second waveguide by the slit guide is preferably equal to an odd multiple of the coupling length Lc in order to allow the transfer of the component TE into the second waveguide 1b.

As an embodiment example, the electromagnetic wave can be brought into the coupling device through an optical fiber either by the network method, or by the "taper" method.

In the network method, the waveguide 1 comprises a plurality of ribs on its surface, each rib being preferably perpendicular to the longitudinal axis of the waveguide. The optical fiber is oriented in a direction close to the normal in the plane containing the ribs, i.e. in the plane of the guide.

In the "taper" method the waveguide 1 comprises, for example, a divergent or convergent end (reversed taper) in abutment with the optical fiber in the plane of the guides. Such an embodiment is described in the document "IEEE photonics technology letters" Volume 17 n° 12 of Roelkens et al.

A method for embodying a coupling device illustrated in FIGS. 12 to 16 comprises, on a substrate, the following successive steps:

forming a waveguide 1 (FIGS. 12 and 13), forming a slit metal guide 2 (FIGS. 15 and 16) in a plane offset from the plane of the waveguide 1 so that the slit metal guide partially covers the waveguide 1 and the slit 4 is delimited by two coplanar metal elements 3a, 3b. Preferably, the slit 4 of the slit guide 2 is oriented along a longitudinal axis A1 of the waveguide. As indicated previously, the offset can be carried out by means of a dielectric material.

Figure 14:
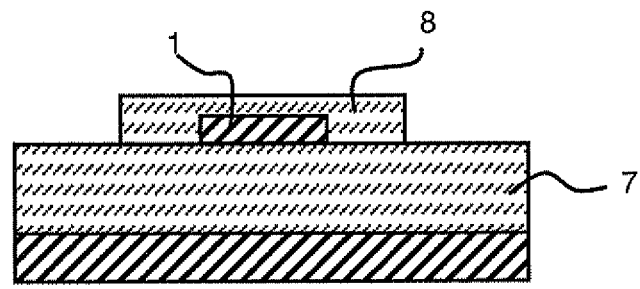
Figure 15:
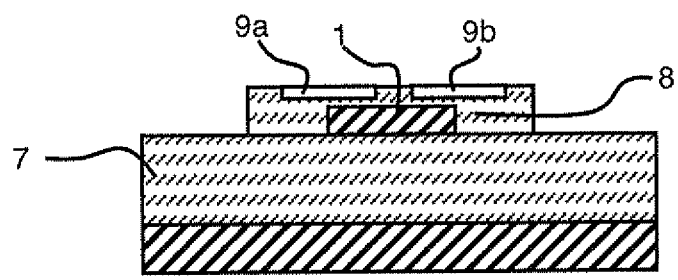
Figure 16:
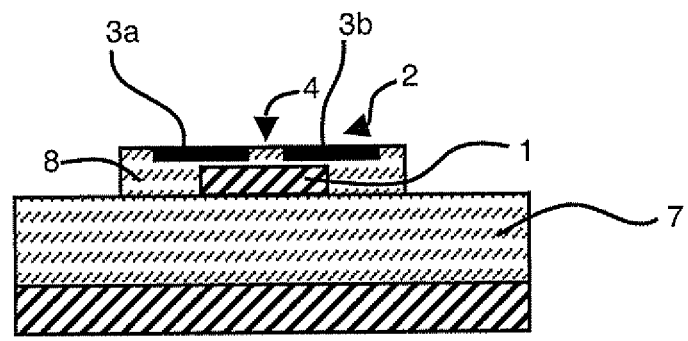

According to a development, after the formation of the waveguide 1, the latter is encapsulated or partly covered, before the formation of the slit guide 2, by a dielectric material 8 of low refractive index compared to the refractive index of the waveguide 1, this dielectric material 8 is preferably made out of silicon oxide (FIG. 14). By low index, it is understood a material whose refractive index lies between 1 and 2.5. In particular, this encapsulation makes it possible to offset the two guides from one another and to take part in the formation of the slit metal guide 2.

Figure 12:
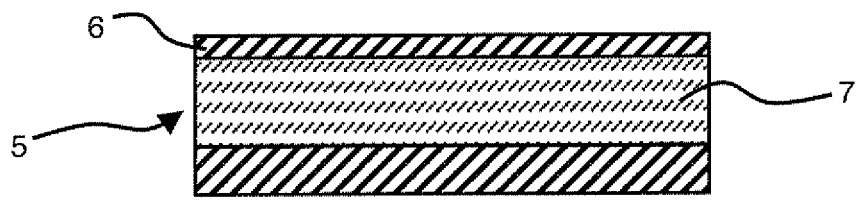
FIGS. 12 to 16 illustrate a method for manufacturing a device according to the invention.
Figure 13:
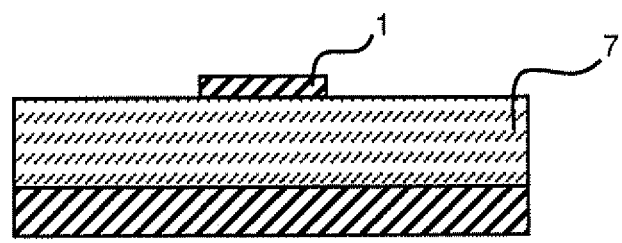

Preferably, the coupling device can advantageously be made as illustrated in FIG. 12 from a substrate 5 of SOI type (silicon 6 on an insulating material 7). Thus, the step of formation of the waveguide 1 is carried out by partially or totally etching the upper layer 6 out of silicon. By totally etching, it is understood etching the upper layer 6 out of silicon down to the layer 7 out of insulating material in order to form the waveguide 1 out of silicon. A partial etching allows for example to form ribs for the coupling with an optical fiber as described previously.

According to an alternative, the formation of the slit metal guide 2 is carried out by the following successive steps:
- etching two cavities 9a, 9b into the dielectric material 8 (FIG. 15) encapsulating or partly covering the waveguide 1, at this step the two cavities 9a, 9b are separated by a wall defining the maximum width and the maximum height of the slit,
- filling the two cavities with a metal, preferably silver or copper (FIG. 16), the thickness of the metal deposited defining the height of the slit.

It is also possible to encapsulate the waveguide 1 then to carry out on the encapsulation a layer having particular optical properties such as previously defined (emission, modulation, non-linearity). Preferably, this layer is germanium or silica filled with nanocrystals. The cavities can then be made in this last layer and the slit is automatically filled with the corresponding material.

Preferably, the slit guide 2 is produced by the Damascene method, i.e. the dielectric 8 encapsulating or partly covering the waveguide 1 is partially or completely etched above the waveguide 1 in order to make cavities with dimensions equal to the dimensions of the metal elements 3a, 3b and to delimit the slit 4 of the slit guide. The metal can then be deposited on all the substrate before a polishing preferably withdraws all the metal present outside said cavities 9a, 9b. In the case of total etching, the metal elements 3a, 3b are in contact with the waveguide 1. In the particular previously-described case when the method comprises an additional layer with particular optical properties, this layer can be etched down to the dielectric 8 and the metal element 3a, 3b is then in contact with the dielectric 8.

Thus, the material in the slit, i.e. separating the two elements 3a, 3b forming the slit metal guide 2, can be different from that encapsulating the waveguide 1 or partially covering the waveguide 1. The material can also be withdrawn after formation of the metal elements 3a, 3b in order to leave the slit free.

The Damascene method has the advantage of allowing the making of a slit 4 between the two metal elements 3a, 3b, preferably out of copper and/or silver, whose edges are more abrupt and less rough than those obtained by directly etching the metals. Preferably, the metal used to form the metal elements 3a, 3b is a metal having a low refractive index. This makes it possible to improve the operation of the slit metal guide by decreasing the dissipation losses that can be caused by the roughness of the slit. This method also allows the use of materials whose etching is not easily reproducible such as for example copper.

According to an embodiment, between the step of etching the cavities 9a, 9b and the step of filling the cavities 9a, 9b, the method comprises an chemical etching step at said cavities 9a, 9b to allow the thinning of the wall defining the dimensions of the slit.

It is thus possible to make a slit whose width can lie between 10 nm and 100 nm by means of an optical lithography (DUV).

According to a particular embodiment, after the step of filling the cavities in order to form the slit guide, a step of selective chemical etching of the material between the two metal elements is carried out in order to allow the filling of the slit with another material different from that encapsulating the waveguide 1.

One of the applications of this embodiment is the detection of particles. These particles can be trapped in the slit in the open air, preferably by a micro-fluidic system, so that they modify the propagation constant for the electromagnetic wave in said slit guide and thus the coupling effectiveness to the waveguide. The effectiveness variation then makes it possible to detect certain particles.

In order to protect the slit guide 2, it is possible to encapsulate it into a dielectric with a low refractive index, for example out of silicon oxide. Such a refractive index can lie between 1 and 2.5.

The coupling device is preferably made from non-contaminating metals (copper, aluminum, etc) in order to be able to use the same manufacturing means as those used in the fields of micro-electronics and photonics on silicon.

The above-described coupling device can be used as building bloc in an optical circuit and makes it possible to carry out optical interconnections at very low distances. It has the advantage of a very good effectiveness and of a high compactness.

According to an approach, one seeks to use the coupling device for forming an optical and electric coupler of an object, for example a molecule preferably of nanometric dimensions. Indeed, the use of a thin-layer slit guide, for example with a thickness of about 50 nm, makes it possible to address objects of nanometric dimensions. Such a coupler in particular makes it possible to connect the electric properties transport of the object to its optical properties. Examples of application can be the molecular spectroscopy for studying the electronic states of an unknown object. For a known object, it is possible to optically modulate the conductance of the object, and thus to make a molecular transistor controlled by an optical gate. The invention can also be useful to couple the luminescence of an object towards a silicon waveguide.

A solution to this approach is to combine an optical coupling as described by using a waveguide, and a slit guide combined with an electric coupling.

Figure 17:
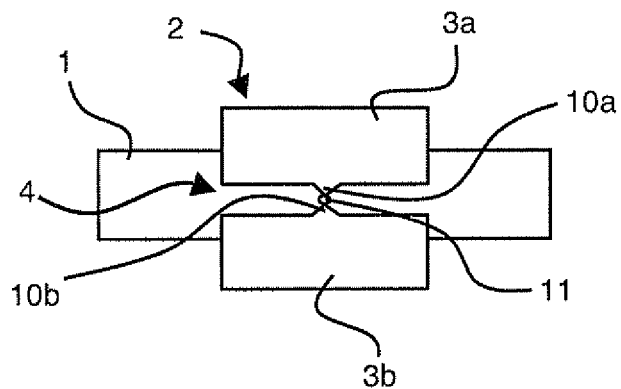
FIGS. 17 to 19 illustrate two embodiments of an optical and electric coupler for an object.
Figure 18:
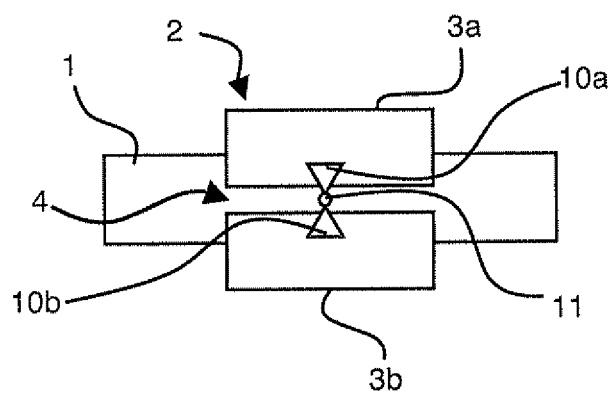
Figure 19:
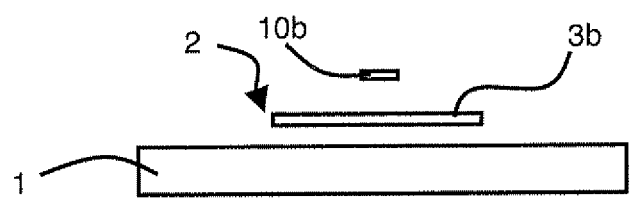

As illustrated in FIGS. 17 to 19, an optical and electric coupler comprises a coupling device as described previously, according to its various embodiments and alternatives, and an electric coupling element provided with two electrodes arranged at the slit of the slit guide 2. The object 11 is preferably in contact with at least one of the electrodes. Of course, the slit guide 2 is optically coupled with the waveguide 1. The Object 11 can also be in contact with the two electrodes, in both cases the object in electrical contact with the electrodes can then be electrically addressed.

The electrodes preferably comprise two microtips 10a, 10b, preferably out of metal, opposite one another, one of the microtip 10a being oriented towards the other microtip 10b. The microtips make it possible to address objects with dimensions lower than those of the slit. For objects larger than the slit (nanowires, nanotubes graphene, etc), the electrodes can have an arbitrary form.

In fact, the acute tip of a microtip 10a, 10b is proximal to the acute tip of the other microtip. The object 11 can be in electrical contact with one of the micro-points 10a, 10b, at its acute tip, or be electrically enclosed by the two microtips 10a, 10b (FIGS. 17 and 18). In a more general way, the object 11 is in electrical contact with at least one of the electrodes.

According to a first embodiment of the coupler illustrated in FIG. 17, the electrodes are formed by the metal elements 3a, 3b of the slit guide 2, and each metal element 3a, 3b comprises at the slit separating them a microtip, one of the microtips 10a, 10b being oriented towards the other microtip. The microtips 10a, 10b are useful to couple nanometric molecules.

In fact, both metal elements 3a, 3b can comprise two edges facing and delimiting the slit, a microtip can be made on one of the edges which locally forms a projection in the direction of a substantially identical projection of the other edge. In other words, the microtips 10a, 10b are arranged in the slit, each metal element 3a, 3b then comprises in the slit separating them a micro-point 10a, 10b, one of the micro-points being oriented towards the other micro-point. In this case, the slit guide 2 makes it possible on the one hand to optically couple the wave with the object 11, and on the other hand to electrically couple the object 11, for example by connecting the two metal elements 3a, 3b, with an measurement and/or polarization electronics.

According to a second embodiment illustrated in FIGS. 18 to 19, the metal elements 3a, 3b of the slit guide 2 are located between the waveguide 1 and the electrodes, preferentially comprising micro-points 10a, 10b. Contrary to the mode above, the electrodes are then distinct from the metal elements 3a, 3b but remain at, i.e. near, the slit. Said electrodes can be located between 0 nm and 500 nm from the metal elements 3a, 3b, and in a general way until half the incidental wavelength, and preferably at a minimal distance higher than the width of the slit. In other words, the electrodes are located in a plane offset from the plane of the metal elements 3a, 3b, and are preferably arranged above the slit 4. In fact, in this second embodiment, the electrodes are distinct from the metal elements 3a, 3b. Preferably, in the second embodiment, the electrodes are separated from the metal elements 3a, 3b by a layer out of a dielectric material, for example out of silicon oxide, with a low index compared to the waveguide 1, typically the refractive index of the dielectric material lies between 1 and 2.5. The second embodiment has the advantage of not obstructing the optical coupling of the waveguide 1 with the slit guide 2 compared to the first embodiment of the coupler.

The thickness of the electrodes of the second embodiment in a direction perpendicular to the plane of the waveguide can lie between some nanometers in a zone for the electric coupling of objects of nanometric dimensions (molecules) and a hundred nanometers in a recontacting zone for facilitating said electrical recontact. In other words, each electrode can comprise an electric coupling zone (addressing the object) whose thickness is lower than a recontacting zone for the electrodes. Of course, in the first embodiment of the coupler, the thickness of the electrodes is equal to the thickness of the metal elements 3a, 3b. In fact, a fine thickness of the electrodes makes it possible to contact an object of nanometric dimensions (for example a molecule). For larger objects like nanowires, nanotubes, graphene, the thicker the contact in the coupling zone is, the better it is.

In both embodiments of the coupler comprising the microtips 10a, 10b, these are preferably located at the median of the slit, said median being perpendicular to the longitudinal axis of the slit. In particular, this makes it possible to reduce the surface of the electrodes therein, or near the slit, in order to disturb at least the propagation of the light signal. The spacing between the two electrodes (for example via the microtips) is preferably lower than 200 nm. For objects larger than the slit, the electrodes can be offset from one another, and can be spaced out with of a dimension larger than that of the width of the slit.

In order to make a spacing lower than 30 nm between the microtips, these can be obtained by forming electrodes in electrical contact and separated by a relatively thin bridge (for example a thickness of ten nanometers, and approximately side dimensions of 50 nm×100 nm). Then these electrodes can be current-polarized in order to break the bridge, and to space the two electrodes from one another with a nanometric gap. It can also be possible to apply mechanical constraints to the bridge in order to break it and delimit the microtips. For a spacing higher than 30 nm, it is used lithography/etching techniques.

Preferably, the microtips 10a, 10b and the metal elements 3a, 3b of the slit guide 2 are made out of different materials to ensure a good ohmic contact of the microtips with the object. In general, the microtips are formed by multi-layers out of metal such as for example Al or Au.

The object 11 can be an object with nanometric dimensions as a nanowire, graphene, or a quantum box whose growth then the deposit can be carried out so that said box becomes in contact with the electrodes.

An electrical contact between the object and the electrodes can be obtained by electromigration when the object is a molecule, or one or more metal particle(s) (gold balls for example).

To summarize, if the object has nanometric dimensions such as for example a molecule, electrodes with microtips are preferably used, and for larger objects, such as nanowires, carbon nanotubes or graphene, conventional electrodes are used, the electrodes are preferably arranged in order not to obstruct the propagation of the light signal through the slit guide. Only the metal elements can also be used as electrodes.

The coupler has a strong optical coupling effectiveness towards an object of nanometric dimensions, indeed, the wave in the slit of the slit guide has a concentration hundred times higher than the concentration of the prior art.

The invention claimed is:

1. Device for coupling an electromagnetic wave comprising successively:
   a waveguide;
   a dielectric layer; and
   a slit metal guide formed by two metal elements which are coplanar and spaced out from one another so as to delimit a slit, the slit metal guide is arranged so as to partially cover the waveguide, the slit arranged so as to partially cover the waveguide and being separated from the waveguide by the dielectric layer.

2. The device according to claim 1, wherein the waveguide has a first effective index and the slit metal guide has a second effective index, the waveguide and the slit guide are configured so as to obtain a ratio between the first and second effective index comprised between 0.8 and 1.2.

3. The device according to claim 1, wherein the waveguide has a longitudinal axis corresponding to a propagation direction of an electromagnetic wave within the waveguide, and wherein the slit metal guide partially covers the waveguide, over a partial covering length, along the longitudinal axis, equal to an odd positive multiple of an effective coupling length between the waveguide and the slit metal guide.

4. The device according to claim 1, wherein the waveguide comprises first and second separated elements having respectively first and second longitudinal axes corresponding to a propagation direction of an electromagnetic wave within respectively the first and second elements, and wherein the slit metal guide is arranged so as to partially cover the first element, over a first partial covering length, along the first longitudinal axis, and to partially cover the second element, over a second partial covering length, along the second longitudinal axis.

5. The device according to claim 4, wherein the first partial covering length is equal to an odd positive multiple of an effective coupling length between the slit metal guide and the first element.

6. The device according to claim 1, wherein the two metal elements of the slit metal guide are connected, to a voltage source configured to cause an electrical potential difference between the two elements.

7. The device according to claim 6, wherein the slit is filled with a non linear material, so as to modify optical properties of the material comprised in the slit according to the electrical potential difference.

8. The device according to claim 7, wherein the slit is filled with silica material comprising silicon nanocrystals, or with a polymer material.

9. The device according to claim 6, wherein the slit is filled with a material having modulation properties, so as to modulate the electromagnetic wave propagated within the device.

10. The device according to claim 9, wherein the slit is filled with germanium or ferroelectric PZT or BST materials.

11. The device according to claim 6, wherein the slit is filled with a material with emission properties, so as to perform a stimulated emission in the slit.

12. The device according to claim 11, wherein the slit is filled with silica material comprising silicon nanocrystals, the silica being doped with Erbium ions or ions of an element of the family of III-V semiconductors.

13. The device according to claim 6, wherein each of the two metal elements comprises, in the slit, a protruding microtip, the microtips are separated and arranged so as to be directed towards one another.

14. The device according to claim 13, wherein a submicronic object is in electrical contact with at least one of the microtips so as to address the submicronic object.

15. The device according to claim 1, wherein two separated microtips are disposed above the slit of the slit metal guide and are arranged so as to be directed towards one another, the two microtips are connected to a voltage source configured to cause an electrical potential difference between the two microtips.

16. The device according to claim 15, wherein a submicronic object is in electrical contact with at least one of the microtips so as to address the submicronic object.

17. The device according to claim 1, wherein the two metal elements of the slit metal guide are connected to a sensitive device configured to measure an electrical potential difference between the two metal elements.

18. The device according to claim 17, wherein each of the two metal elements comprises, in the slit, a protruding microtip, the microtips are separated and arranged so as to be directed towards one another.

19. The device according to claim 18, wherein a submicronic object is in electrical contact with at least one of the microtips so as to address the submicronic object.

20. The device according to claim 1, wherein two separated microtips are disposed above the slit of the slit metal guide and are arranged so as to be directed towards one another, the two microtips are connected to a sensitive device configured to measure an electrical potential difference between the two microtips.

21. The device according to claim 20, wherein a submicronic object is in electrical contact with at least one of the microtips so as to address the submicronic object.

22. Method for manufacturing a coupling device, comprising on a substrate the following successive steps:
    forming a waveguide;
    encapsulating or partially covering the wave guide by a dielectric material; and
    forming a slit metal guide comprising of two metal elements which are coplanar and spaced out from one another so as to delimit a slit, the slit metal guide is formed so as to partially cover the waveguide, the slit arranged so as to partially cover the waveguide and being separated from the waveguide by the dielectric layer.

23. The method according to claim 22, wherein the dielectric material has a refractive index comprised between 1 and 2.5.

24. The method according to the claim 22, wherein the substrate is a silicon on insulator substrate comprising a silicon layer disposed on an electrically insulating material layer, and wherein the waveguide is a silicon guide delimited by etching the silicon layer down to the electrically insulating material layer.

25. The method according to claim 22, wherein the formation of the slit metal guide is carried out by the following successive steps:
    etching two cavities into the dielectric material,
    filling the two cavities with metal.

26. The method according to claim 25, wherein between the etching step and the filling step, it comprises a chemical etching step for thinning a height of the slit.

\* \* \* \* \*